(12) United States Patent
Lin

(10) Patent No.: US 8,106,894 B2
(45) Date of Patent: Jan. 31, 2012

(54) PROJECTOR

(75) Inventor: Chia-Hung Lin, Tai-Chung Hsien (TW)

(73) Assignee: Watonga Technology Inc., Carson City, NV (US)

( * ) Notice: Subject to any disclaimer, the term of this patent is extended or adjusted under 35 U.S.C. 154(b) by 417 days.

(21) Appl. No.: 10/709,072

(22) Filed: Apr. 12, 2004

(65) Prior Publication Data

US 2004/0207650 A1   Oct. 21, 2004

(30) Foreign Application Priority Data

Apr. 17, 2003 (TW) ............................... 92109002 A

(51) Int. Cl.
*G09G 5/00* (2006.01)
(52) U.S. Cl. ........................................ 345/204; 348/473
(58) Field of Classification Search .................. 345/102, 345/204, 690; 348/743
See application file for complete search history.

(56) References Cited

U.S. PATENT DOCUMENTS

| | | | | |
|---|---|---|---|---|
| 5,625,424 A | * | 4/1997 | Conner et al. | 348/743 |
| 5,774,196 A | * | 6/1998 | Marshall | 348/743 |
| 6,809,714 B1 | * | 10/2004 | Yamauchi et al. | 345/88 |
| 6,912,017 B1 | * | 6/2005 | Minami et al. | 348/743 |
| 2001/0043288 A1 | * | 11/2001 | Smith | 348/743 |
| 2002/0060754 A1 | * | 5/2002 | Takeuchi | 348/745 |
| 2002/0163527 A1 | * | 11/2002 | Park | 345/594 |
| 2003/0179435 A1 | * | 9/2003 | Tomiya | 359/291 |

FOREIGN PATENT DOCUMENTS

IL   WO01/95544   * 11/2002

* cited by examiner

*Primary Examiner* — Yong H Sim
(74) *Attorney, Agent, or Firm* — David R. Stevens; Stevens Law Group

(57) ABSTRACT

A projector capable of projecting a gray-level image for adjusting a color wheel delay includes a housing, a light source installed in the housing, a color wheel, an image modulator, a control circuit, and a scalar. The color wheel separates the light from the light source into color light. The image modulator modulates the color light from the color wheel and projects the color light to form an image on a screen. The control circuit connected to the image modulator controls the image modulator to operate synchronously with the color wheel. The scalar connected to the image modulator generates a gray-level image signal. The image modulator modulates the color light and forms a gray-level image on the screen by receiving the gray-level image signal from the scalar. The control circuit adjusts the image modulator to operate synchronously with the color wheel according to the gray-level image signal.

16 Claims, 4 Drawing Sheets

PROJECTOR

BACKGROUND OF INVENTION

1. Field of the Invention

The invention relates to a projector, and more particularly, to a projector capable of projecting a gray-level image for adjusting a color wheel delay.

2. Description of the Prior Art

Generally speaking, there are two kinds of projectors, specifically, a projector with one image modulator and a projector with three image modulators. The projector with one image modulator focuses light from a light source on a color wheel with red, green, and blue colors through a lens, separates the light into red light, green light, and blue light by rotating the color wheel at high speed, harmonizes the color light with a relay lens, reflects the color light on the image modulator with a prism, controls the image modulator to operate synchronously with the color wheel with a control circuit, and projects the colored light on a screen. The projector with three image modulators divides a light source into red light, green light, and blue light; modulates the red light, green light, and blue light separately with three image modulators; combines the red light, green light, and blue light to form a colored image; and projects the colored image on a screen through a projection lens. Because the projector with one image modulator reflects the red light, green light, and blue light on one image modulator, colors and brightness of the image projected by the projector with one image modulator are not as good as those of the image projected by the projector with three image modulators. However, the projector with one image modulator has the advantages of smaller size, low weight, and portability. With the technical advance of the image modulator, most projectors are designed with one image modulator.

The digital light processing (DLP) projector uses a technique developed by the Texas Instrument Corporation. The DLP projector comprises a digital micromirror device (DMD) that forms and projects an image by reflecting light with reflection mirrors on the digital micromirror device chips. The digital micromirror device has the qualities of sensitive reaction and full utilization of light, which are necessary for projectors with a single image modulator, therefore, projectors with one image modulator are usually implemented with the DLP projector.

FIG. 1 is a diagram of a projector 10 with one image modulator according to the prior art. The projector 10 comprises a light source 12, a lens 14, a color wheel 16, a relay lens 20, a sensor 18, a mark 17, a motor 15, a prism 22, an image modulator 24, a control circuit 26, and a camera lens 28. The color wheel 16 comprises a red filter, a green filter, and a blue filter. The motor 15 rotates the color wheel 16 and the sensor 18 senses the mark 17 on the color wheel 16 to detect the position of the colored filters. The light source 12 emits light and the light is focused via the lens 14. The light passes through the color wheel 16 and the relay lens 20 and is reflected on the image modulator 24 via the prism 22. The control circuit 26 controls the image modulator 24, transmits a red image, green image, or blue image according to the light passing through the red filter, the green filter, or the blue filter, and projects the image on a screen 30 via the camera lens 28. When the image modulator 24 transmits a colored image, it should operate synchronously with the color wheel 16 so as to precisely project the color passing through the colored filter areas. The sensor 18 detects positions of the machine axis or the motor armature. However, no matter whether an electronic or mechanical method is used, an inaccuracy still occurs and, therefore, adjusting the image modulator 24 to operate synchronously with the color wheel 16 is necessary. The value adjusted is the color wheel delay.

The projector 10 of the prior art adjusts the color wheel delay by displaying a predetermined testing curtain. For example, a red curtain, green curtain, or blue curtain could be used. The projected image is captured via an additional optical sensor and transformed into analog signals. The wave pattern of the analogy signals is displayed with an oscilloscope. The color wheel delay is adjusted according to the difference between the wave pattern displayed by the oscilloscope and the ideal wave pattern. The adjustment allows the image modulator 24 to operate synchronously with the color wheel 16 and the red light, green light, and blue light projected by the projector 10 is not mixed with another color light.

As described previously, the projector 10 with one image modulator 24 focus the light on the rotating color wheel 16 to separate the light into red light, green light, and blue light. The image modulator 24 modulates the red image, green image, or blue image using the light passing through the rotating color wheel 16. By adjusting the color wheel delay of the projector 10, the image modulator 24 operates synchronously with the color wheel 16 so that the projector 10 precisely projects the color passing through the color wheel 16. According to the prior art, the additional optical sensor and the oscilloscope are necessary to adjust the color wheel delay, however, these devices are expensive, not commonly available, and inconvenient.

SUMMARY OF INVENTION

It is therefore a primary objective of the claimed invention to provide a projector capable of projecting a gray-level image for adjusting a color wheel delay to solve the above-mentioned problems.

According to the claimed invention, the projector comprises a housing, a light source installed in the housing, a color wheel for separating the light from the light source into color light, an image modulator for modulating the color light from the color wheel, a control circuit connected to the image modulator for controlling the image modulator to operate synchronously with the color wheel, and a scalar connected to the image modulator for generating a gray-level image signal. The image modulator forms a gray-level image on the screen by receiving the gray-level image signal from the scalar. The gray-level image has 32 gray-levels generated for the red, green, and blue colors. A user can adjust the color wheel delay according to the gray-level image.

These and other objectives of the present invention will no doubt obvious to those of ordinary skill in the art after reading the following detailed description of the preferred embodiment that is illustrated in the various figures and drawings.

DETAILED DESCRIPTION

Figure 1:
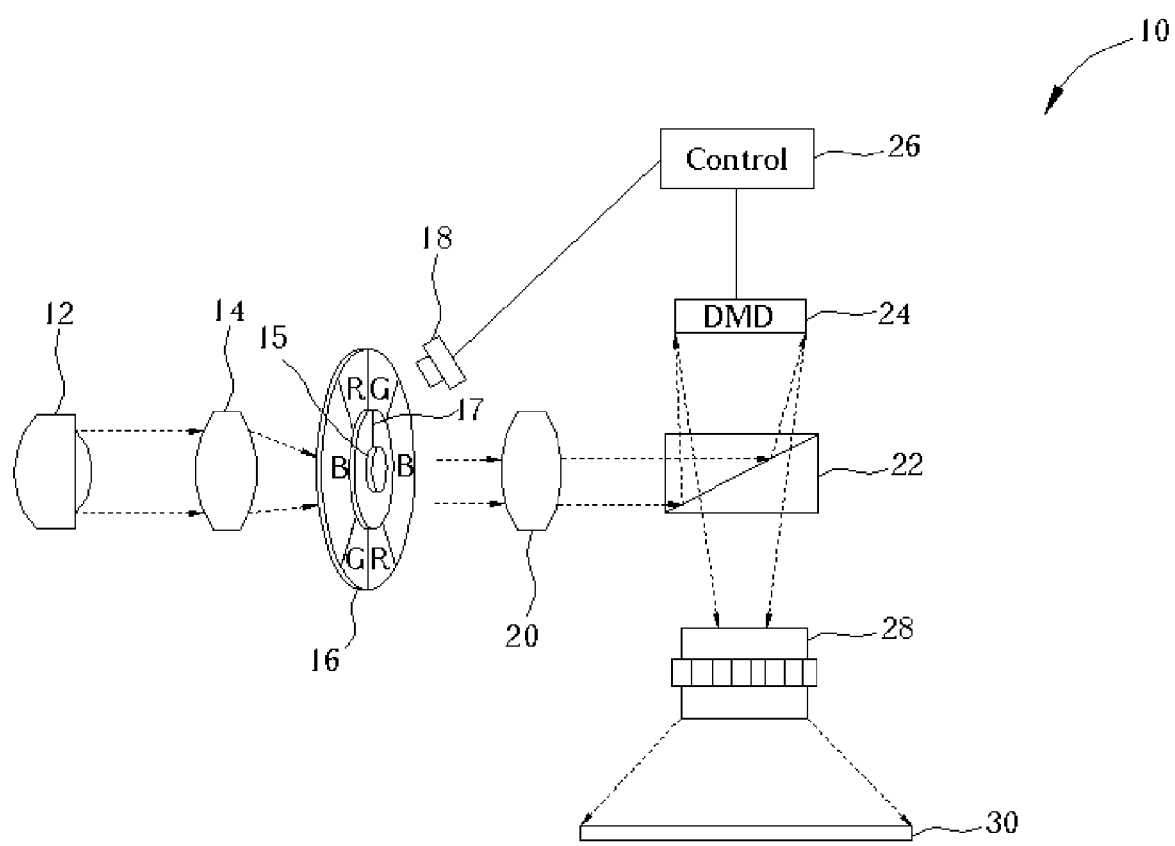
FIG. 1 is a diagram of a projector with a single image modulator according to a prior art.
Figure 2:
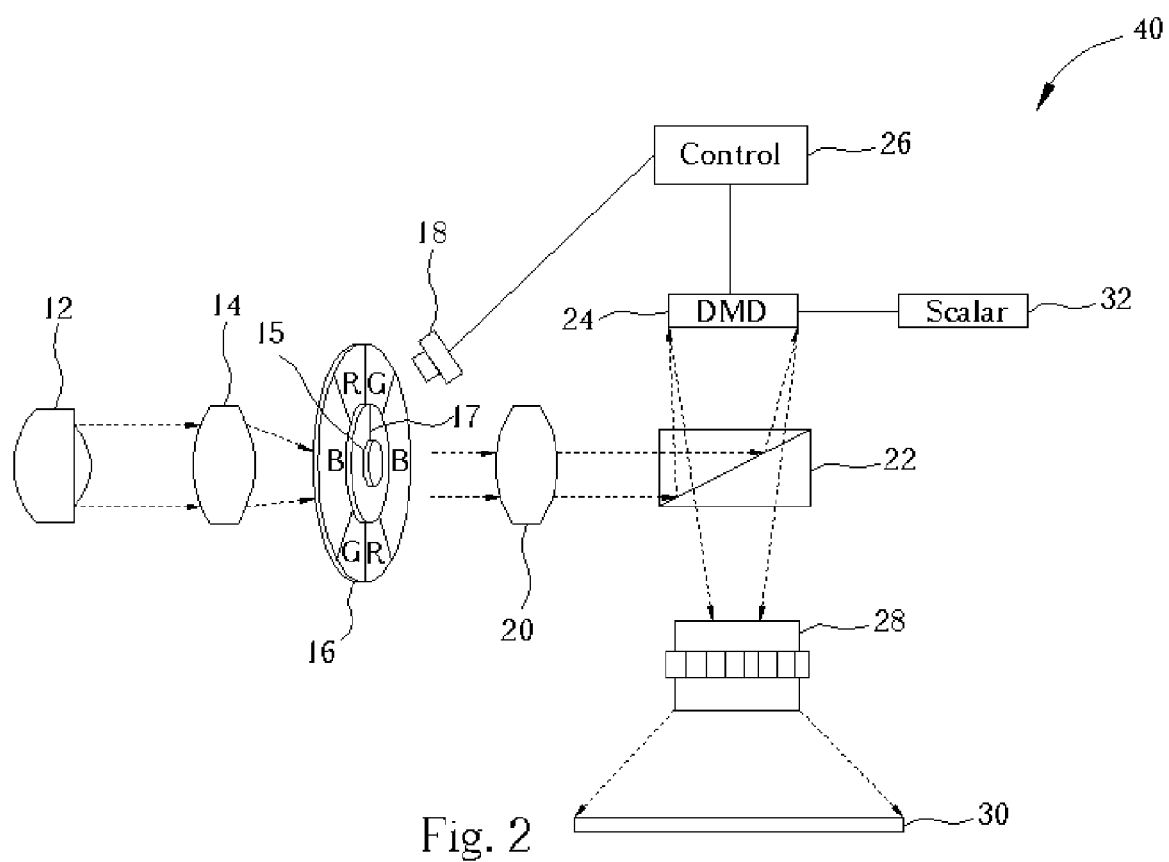
FIG. 2 is a diagram of a projector according to the present invention.

FIG. 2 is a diagram of a projector 40 according to the present invention. The elements that are the same as those shown in FIG. 1 and FIG. 2 are marked with same numbers. The projector 40 comprises a light source 12, a lens 14, a color wheel 16, a relay lens 20, a sensor 18, a mark 17, a motor 15, a prism 22, an image modulator 24, a control circuit 26, a camera lens 28, and a scalar 32. The light source 12 emits light, and the light is focused on the color wheel 16 via the lens 14. The motor 15 rotates the color wheel 16 to separate the light into red light, green light, and blue light. The colored light passes through the relay lens 20, and is reflected on the image modulator 24 via the prism 22. The control circuit 26 uses the sensor 18 to detect the mark 17 on the color wheel 16, and controls the image modulator 24 to operate synchronously with the color wheel 16. Finally, the image modulator 24 projects an image on a screen 30 via the camera lens 28. If the image modulator does not operate synchronously with the color wheel 16, the color of the image on the screen 30 will be mixed with other colors. For example, the image of a red apple could look like a yellow apple and is due to the image modulator 24 projecting a red apple image on the screen 30 as the light passes through the green filter areas of the color wheel 16. Adjusting the color wheel delay can solve this problem, however, it is not easy to adjust the color wheel delay accurately by watching the red apple image on the screen 30. Therefore, the projector 40 provides the scalar 32 to project the gray-level image on the screen 30 as an OSD (on screen display) so that the user can easily adjust the color wheel delay of the projector 40 by watching the gray-level image.

Figure 3:
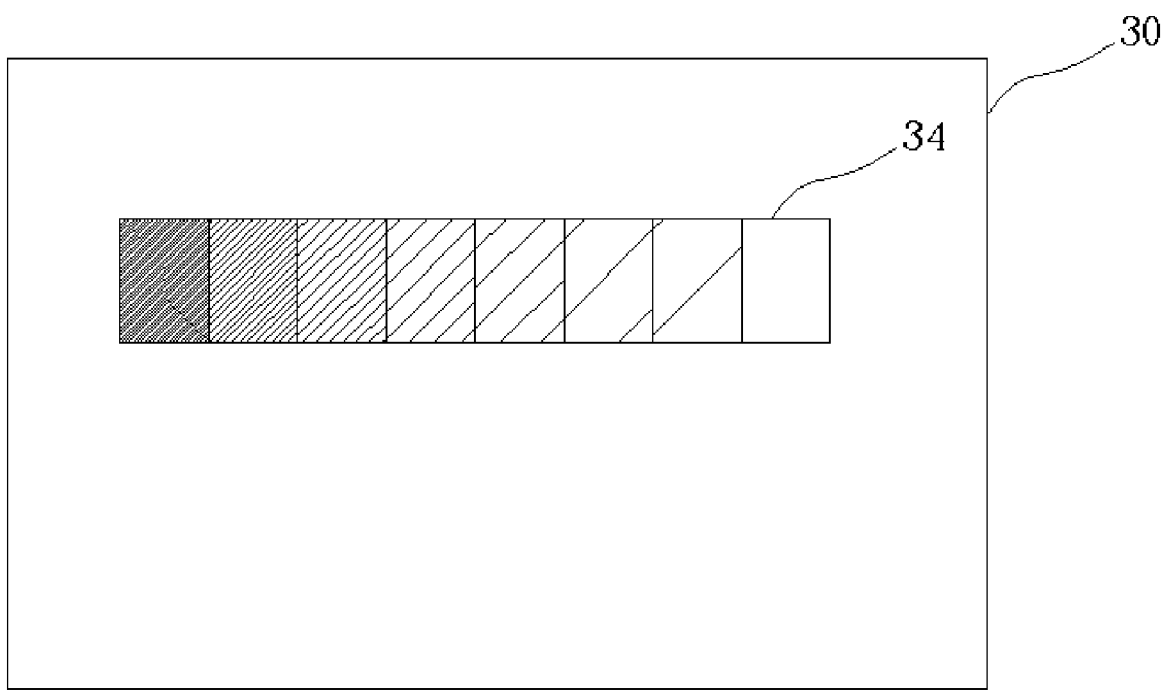
FIG. 3 is a diagram of a gray-level image projected by the projector according to the present invention.

FIG. 3 is a diagram of the gray-level image projected by the projector 40 according to the present invention. The scalar 32 outputs a gray-level image signal to the image modulator 24, and projects a gray-level image 34 generated for one color on the screen 30. The gray-level image 34 is displayed as an OSD on the screen 30, which is the most common method of adjusting a monitor. The OSD shows the adjustable items provided by the monitor on a screen, and covers part of the image displayed on the screen so that the user can immediately adjust the image. The OSD is usually a window showing figures representing different adjustable items. Therefore, when the color of the image displayed on the screen is not correct, the user can open the window for adjusting the color wheel delay. As shown in FIG. 3, the scalar 32 projects the gray-level image 34 with 32 gray-levels generated for the color red, so that the user can adjust the color wheel delay of the projector 40 according to the colors of the gray-level image 34. Presuming the color wheel 16 comprises two red filters, two green filters, and two blue filters, and that it filters the colored light in the order of red light, green light, and blue light; the yellow color mixed in the gray-level image 34 generated for red on the screen 30 represents that the image modulator 24 is projecting the red image on the screen 30 too slowly. The color red on the screen 30 is mixed with the color green, which becomes the color yellow. In this situation, the user can decrease the color wheel delay value with control keys of the projector 40. Oppositely, if the color purple is mixed in the gray-level image 34 generated for red on the screen 30, this represents that the image modulator 24 is projecting the red image on the screen 30 too quickly. The color red on the screen 30 is mixed with the color blue, which becomes the color purple. In this situation, the user can increase the color wheel delay value with the control keys of the projector 40.

Figure 4:
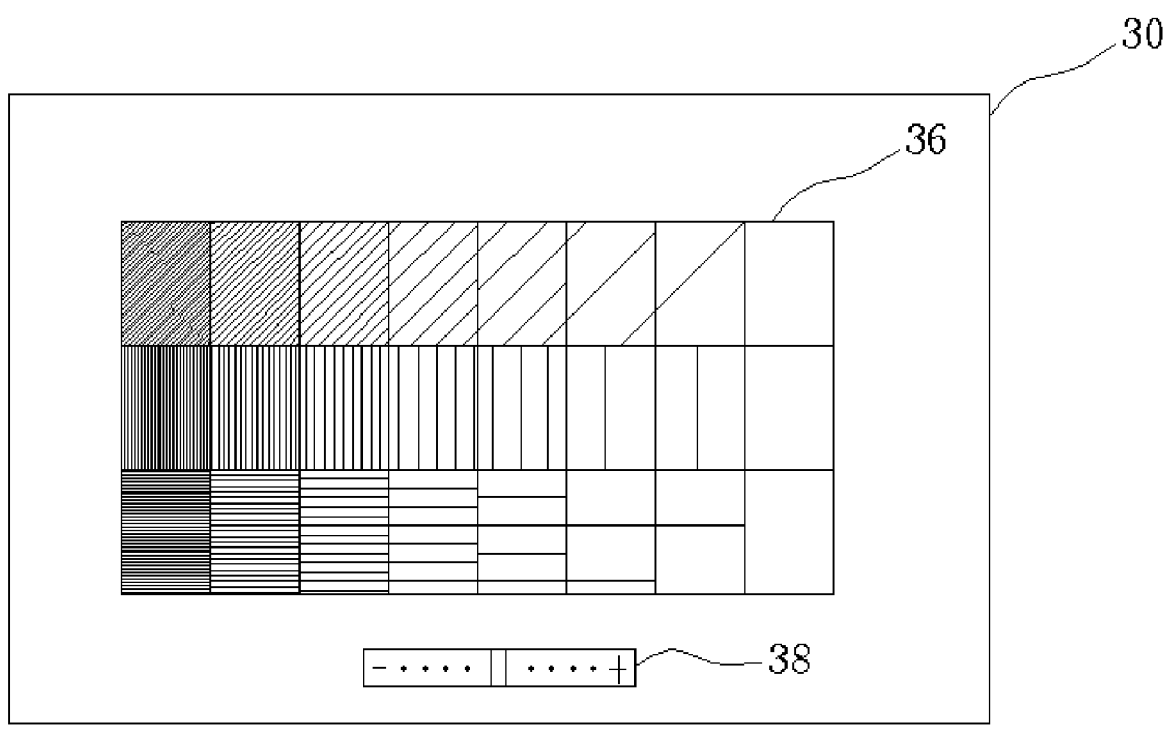
FIG. 4 is a diagram of a gray-level image and an adjustment check both projected by the projector according to the present invention.

FIG. 4 is a diagram of a gray-level image 36 and an adjustment check 38 both projected by the projector 40 according to the present invention. In the preferred embodiment of the present invention, the projector 40 projects two OSDs on the screen 30, wherein one OSD displays the gray-level image 36, and the other OSD displays the adjustment check 38. A colored image is formed with the three primary colors (red, green, and blue). Generally speaking, as long as one of the three colors is precisely projected on the screen 30, the image modulator 24 is operating synchronously with the color wheel 16. However, to allow the user to adjust the color wheel delay more easily, the gray-level image 36 is generated with 32 gray-levels for the color red, the color green, and the color blue. When the color wheel delay value is too large, the gray-level image generated for red is mixed with the yellow color and the gray-level image generated for blue is mixed with the purple color. In the situation, the user can control the adjustment check 38 to decrease the color wheel delay value. When the color wheel delay value is too small, the gray-level image generated for red is mixed with the purple color and the gray-level image generated for green is mixed with the yellow color. In the situation, the user can control the adjustment check 38 to increase the color wheel delay value.

According the foregoing description, the projector 40 projects the gray-level image 36 on the screen 30 as an OSD with the scalar 32 so that the user can adjust the color wheel delay of the projector 40 and ensure the projector 40 projects the colored image precisely according to the gray-level image 36. In the first embodiment, the projector 40 projects one OSD, which displays the gray-level image 34 generated for the red color via the scalar 32. When the color wheel delay value is too large or too small, the gray-level image 34 generated for the red color is mixed with the yellow color or the purple color respectively. The user can adjust the color wheel delay value via the control keys of the projector 40. In the second embodiment, the projector 40 projects two OSDs on the screen 30. The first OSD displays the gray-level image 36 generated for the red, green, and blue colors, which allow the user to adjust the color wheel delay more easily. The second OSD displays the adjustment check 38, which allows the user to see how much the color wheel delay value has been adjusted.

The projector of the prior art adjusts the color wheel delay with an additional optical sensor and an oscilloscope. However, these additional devices are expensive and inconvenient. In contrast to the prior art, the projector of the present invention provides the internal scalar to project a gray-level image on the screen as an OSD allowing the user to conveniently and quickly adjust the color wheel delay according to the gray-level image.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A projector comprising:
   a housing;
   a light source installed in the housing;
   a color wheel for separating the light from the light source into color light;
   an image modulator for modulating the color light from the color wheel, and projecting the color light to form an image on a screen;
   a scalar connected to the image modulator for controlling the image modulator to create a gray-level image, wherein the gray-level image includes gray levels, for facilitating adjustment of a color wheel delay of the projector, wherein the adjustment includes minimizing one of yellow and purple color in the projected gray-level image for producing a gray image with substantial absence of color; and a control circuit for projecting an on screen display (OSD) on a screen, the OSD comprising the gray-level image created by the scalar, and a user interface for manually adjusting the color wheel delay of the projector to produce a gray image on the OSD with substantial absence of color, thereby synchronizing the color wheel with the image modulator to achieve said adjusted gray image having substantial absence of color.

2. The projector of claim 1 wherein the image modulator is a digital micromirror device (DMD).

3. The projector of claim 1 wherein the gray-level image has 32 gray-levels.

4. The projector of claim 1 wherein gray-level images are generated for 3 colors.

5. The projector of claim 1, in which said user interface comprises control keys accessible to said user which allow said user to increase or decrease the color wheel delay value.

6. The projector of claim 1, in which said on screen display (OSD) also displays an adjustment check that allows the user to see how much the color wheel delay value has been adjusted.

7. The projector of claim 4 wherein the 3 colors having gray-level images are red, green, and blue.

8. A method for manually adjusting a color wheel delay of a projector, the projector comprising a light source, a color wheel for separating light from the light source into color light, an image modulator for modulating the color light from the color wheel, and a control circuit for controlling the image modulator to operate synchronously with the color wheel, the method comprising:
    using a scalar to control the image modulator to create a gray-level image, wherein the gray-level image includes gray levels, for facilitating adjustment of the color wheel delay of the projector, wherein the color wheel delay is adjusted to minimize one of yellow and purple color in the projected gray-level image for producing a grey image with substantial absence of color; and
    utilizing a control circuit to project an on screen display (OSD) on a screen, the OSD comprising the gray-level image created by the scalar; and
    observing the OSD, and manually adjusting the color wheel delay of the projector with a user interface connected to the control circuit to produce a gray image on the OSD with substantial absence of color, thereby synchronizing the color wheel with the image modulator to achieve said adjusted gray image having substantial absence of color.

9. The method of claim 8 wherein the image modulator is a digital micromirror device (DMD).

10. The method of claim 8 wherein the gray-level image has 32 gray-levels.

11. The method of claim 8 wherein gray-level images are generated for 3 colors.

12. The projector of claim 11 wherein the 3 colors having gray-level images are red, green, and blue.

13. A projector comprising:
    a housing;
    a light source installed in the housing;
    a color wheel for separating the light from the light source into color light;
    an image modulator for modulating the color light from the color wheel, and projecting the color light to form an on screen display (OSD) image on a screen;
    a control circuit connected to the image modulator for controlling the image modulator to operate synchronously with the color wheel;
    a user interface for controlling a color wheel delay value to produce an adjusted gray image on the OSD with substantial absence of color; and
    a scalar connected to the image modulator for generating a gray-level image signal to achieve said adjusted gray image on the OSD having substantial absence of color;
    wherein the color light is modulated to form a gray-level image, wherein the gray-level image includes gray levels, on the screen through a gray-level image signal outputted to the image modulator, for facilitating adjustment of the color wheel delay value, wherein the adjustment includes minimizing one of yellow and purple color in the projected gray-level image, and the image modulator is controlled by the user interface to operate synchronously with the color wheel according to the gray-level image to produce a gray image on the OSD having substantial absence of color.

14. A method for manually adjusting the color accuracy of a projector, the projector comprising a light source, a color wheel for separating light into color light, a image modulator for modulating the color light from the color wheel and projecting the color light to form an image on a screen, a control circuit for controlling the image modulator to operate synchronously with the color wheel and for projecting an on screen display (OSD), and a user interface for manually adjusting the color wheel delay value, the method comprising:
    providing a scalar connected to the image modulator;
    using the scalar to control the image modulator to create and display a gray-level image, wherein the gray-level image includes gray levels, on a screen, for facilitating adjustment of the color wheel delay value of the projector, wherein the color wheel delay is adjusted to minimize one of yellow and purple color in the projected gray-level image for producing an adjusted grey image with substantial absence of color; and
    observing the gray-level image, and using the user interface and the control circuit, to control the image modulator to operate according to rotation of the color wheel for projecting an image on the screen to achieve said adjusted gray image having substantial absence of color.

15. A projector, comprising:
    a housing;
    a light source installed in the housing;
    a color wheel for separating the light from the light source into color light;
    an image modulator for modulating the color light from the color wheel, and projecting the color light to form an image on a screen;
    a scalar connected to the image modulator for controlling the image modulator to create a gray-level image, wherein the gray-level image includes gray levels, for facilitating adjustment of a color wheel delay of the projector, wherein the adjustment includes minimizing one of yellow and purple color in the projected gray-level image to produce an adjusted gray image; and
    a control circuit for projecting an on screen display (OSD) on a screen, the OSD comprising the gray-level image created by the scalar, and a user interface for manually adjusting the color wheel delay of the projector to synchronize the color wheel with the image modulator to achieve said adjusted gray image projected on the OSD having substantial absence of color.

16. A method, comprising:
    using a provided scalar to control an image modulator of a projector having a light source and for modulating a color light separated by a color wheel of the projector to create a gray-level image, wherein the gray-level image includes gray levels, for facilitating adjustment of the color wheel delay of the projector, wherein the color wheel delay is adjusted to minimize one of yellow and purple color in the projected gray-level image to produce an adjusted gray image; and utilizing the color wheel and a control circuit to control the image modulator of the projector to operate synchronously with the color wheel of the projector to project an on screen display (OSD) on a screen, the OSD comprising the gray-level image created by the scalar, and a user interface for manually adjusting the color wheel delay of the projector to synchronize the color wheel with the image modulator to achieve the adjusted gray image projected on the OSD having substantial absence of color.

* * * * *